United States Patent [19]

Athey, Jr.

[11] Patent Number: 4,588,646

[45] Date of Patent: May 13, 1986

[54] PROTECTIVE SHEET FOR ARTICLES OF CLOTHING AND THE LIKE

[76] Inventor: Robert D. Athey, Jr., 741 Ashbury Ave., El Cerrito, Calif. 94530

[21] Appl. No.: 660,746

[22] Filed: Oct. 15, 1984

[51] Int. Cl.[4] .................. B32B 15/04; B32B 15/06; B32B 15/08

[52] U.S. Cl. .................. 428/457; 428/418; 428/425.8; 428/425.9; 428/461; 428/463; 428/465; 428/492

[58] Field of Search ............ 428/465, 252, 457, 461, 428/463, 418, 492, 425.8, 425.9; 2/1

[56] References Cited

U.S. PATENT DOCUMENTS 3,132,344  5/1964  Langdon .................... 2/1
3,547,765 12/1970  Snyder et al. ............. 428/252
3,858,635  1/1975  Nakamoto et al. ........ 428/465 X
4,294,352 10/1981  Fitzke ......................... 2/1 X

OTHER PUBLICATIONS

Eugene Murphy, "How to Run a Pencil Hardness Test", Industrial Finishing Magazine, p. 37, Aug. 1978.

Primary Examiner—Thomas J. Herbert
Attorney, Agent, or Firm—Bielen and Peterson

[57] ABSTRACT

The protective sheet for use of an article of clothing or shelter utilizing a first layer of soft pliant material which has a low initial tensile modulus of elasticity. Held to the first layer is a second layer of ductile material having metal-like qualities and being impermeable to fluids. The second layer is thinner than the first layer.

15 Claims, 1 Drawing Figure

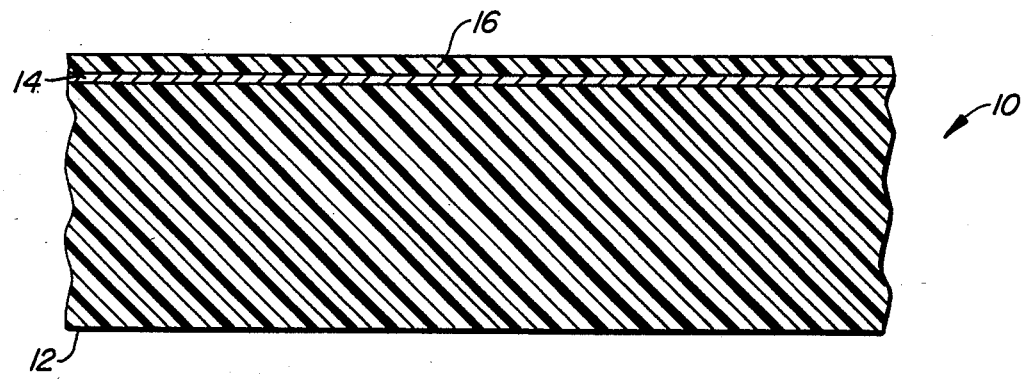
FIG._1.

PROTECTIVE SHEET FOR ARTICLES OF CLOTHING AND THE LIKE

BACKGROUND OF THE INVENTION

In accordance with the present invention a novel and useful protective sheet which may be used to manufacture clothing.

Standard protective articles of clothing such as gloves are normally composed of an organic polymer. It has been found that toxic chemicals such as benezene permeate such articles within a relatively short time. It is believed that the migration of toxic chemicals through the polymer matrix is due to the similarity of the structure of the permeating chemical and the material used to construct the protective article.

One solution is to increase the thickness of the protective article to extend the time of migration for as long as possible. However, articles of clothing often become bulky and therefore this effectiveness of the article of clothing greatly reduces in its use.

Constructing articles of non-flexible and non-polymer material results in a structure that is quite rigid and again not usable in the environment containing toxic chemicals.

A sheet of material which is usable as a protective article of clothing which overcomes the disadvantages of the prior art materials would be a great advance in the field of protective garments.

SUMMARY OF THE INVENTION

In accordance with the present invention a novel and useful protective sheet for use as an article of clothing or for a shelter is provided.

A protective of the present invention utilizes a first layer of soft pliant material which has a low initial tensile modulus of elasticity. The first layer may consist of such materials as butyl rubber, polyurethane, polyethylene, and the like. The low initial tensile modulus of elasticity may be defined as a strain without failure of at least 5% for an application of stress of between 10 and 100 pounds per square inch. The first layer is intended to touch the skin of the user in many cases.

The second layer is also provided and is held to the first layer by any suitable process. The second layer comprises a ductile material which may be capable of forming positive ions and is impermeable to fluids. The second layer is thinner than the first layer. For example the second layer may be a metal, a metal compound such as a metal oxide, an alloy, and the like.

The ductility of the material of the second layer may be defined by an extension of one to four percent at a tensile stress of 1000 psi.

Since the second layer may be damaged by scratching, a third layer is often required fixed to the second layer. The third layer may be constructed of a material which is flexible, relatively oxygen impermeable, water impermeable and scratch resistant. The scratch resistance measured on the pencil hardness test would be at least a value of 2H.

It may be apparent that a novel and useful protective sheet for use of an article of clothing has been described.

It is therefore an object of the present invention to provide a protective sheet which does not permit migration of organic chemicals therethrough and therefore offers protection as an article of clothing or a protective shelter to biological entities.

It is another object of the present invention to provide a protective sheet which may be used as an article of clothing that does not inhibit the movement of the user while offering protection from toxic organic compounds.

Yet another object of the present invention is to provide a protective sheet which may be formed into articles of clothing which are relatively durable while offering protection from toxic organic compounds.

Another object of the present invention is to provide a protective sheet which may be used as an article of clothing or for a protective shelter for a biological entity which is easy and relatively cheap to manufacture.

The invention contains other objects and advantages especially as concerns particular characteristics and features thereof which will become apparent as the specifications continues.

BRIEF DESCRIPTION OF THE DRAWINGS

FIG. 1 is a sectional view of the protective sheet of present invention.

For a better understanding of the invention reference is made to the following detailed description of the preferred embodiments thereof which should be referenced to the hereinabove drawings.

DESCRIPTION OF THE PREFERRED EMBODIMENTS

Various aspects of the present invention will evolve from the following detailed description of the preferred embodiments of the invention which should be referenced to the hereinabove drawings.

The protective sheet 10 includes a first layer 12, which may be constructed of a soft pliant material having a low initial tensile modulus of elasticity. In other words the first layer is stretchable since this terminology is defined as a strain without failure of at least 5% for an application of stress of between 10 and 100 psi. For example, this layer may be composed of materials used in the prior art for making gloves such as butyl rubber, polyurethane, polyethylene, nitrile rubber natural rubber, silicone rubber, polyvinylchloride (plasticized) and the like.

Second layer 14 which is relatively thin, is held to first layer 12. Second layer should be impermeable to fluids such as toxic organic chemicals, e.g. benzine, and be ductile so that it may be employed as an article of clothing and not form any or cracks during during flexure. Second layer may be composed of material capable of forming positive ions or materials of high polarity. Metals, alloys, and metal compcunds fall into this category. Second layer may be applied or formed by lamination, vacuum evaporation or sputtering. The latter techniques permit layer 14 to be quite thin. In certain cases layer 14 can be thin enough to be transparent to visible light waves. In addition, electroplating, or electroless plating may be employed, but in that case, layer 14 would be thicker than the film obtained from the prior discussed techniques. First layer 12 may be as thick as 25 thousandths of an inch. On the other hand, second layer 14 may vary between a tenth of a micron and two thousandths of an inch. A range of zero point two thousandths of an inch to one thousandth of an inch is preferred.

A third layer 16 may also be employed to protect second layer 14 against traumatic damage or corrosion. Second layer metals such as silver, copper, zinc, tin, lead, the platinum group metals and nickel would be in this category. Gold, although not readily corrosive, is easily scratched. Aluminum would form its own protective coating in the form of aluminum oxide but becomes brittle at this point, having a tendency to form cracks or fissures. Alloys such as brass, bronze and pewter possess the same problems as the pure metals. Third layer 16 must be a flexible, oxygen and water impermeable, scratch resistant material. A varnish, paint, or lacquer would suffice in this regard. Reference is made to an article entitled ". . . Run a Pencil Hardness Test", Eugene M. Murphy, page 37 of Industrial Finishing Magazine, 1978. Under the test proposed in this article, third layer 16 would be required to have a minimum hardness of 2H.

Articles of clothing such as masks, gloves, hats, and the like are usually made by dipping, injection or blow molding techniques. In certain cases gloves are formed by simply laminating two sheets of precut patterns together. First layer 12 may be formed in this manner and then second layer 14 may be applied by the techniques described above. However, in the case of lamination the second layer 14 may be preformed as a foil and laminated to the first layer 12 before formation of the article of clothing therefrom. It should be noted, that the forming of layers 12, 14 and/or 16 may be accomplished before formation into articles of clothings or shelters, such as tents. For example lacquer such as polyurethane lacquer, acrylic lacquer, epoxy lacquer and cellulosic lacquer are usable for third layer 16.

In order to describe the invention more completely the following examples are given without intending to limit the invention to the specific example set forth therein except as such as they appear as limitation in the appended claims.

EXAMPLE 1

First and second cups composed of polystyrene were provided. The first and second cup included pigmentation on the inner and outer surfaces.

The outer surface of the second cup was coated by a thin layer of aluminium by vacuum evaporation and top coated with a transparent acrylic lacquer to a thickness of no greater than (1) mil. The outer surface of the first cup was not coated with aluminium and/or the acrylic lacquer leaving the pigmentation visible thereupon.

The first and second cups were each supported by a beaker and filled with 25 ml of methyl isobutyl ketone, a solvent which readily attacks polystyrene.

The following table shows the results observed:

| Elapsed Time | First Cup | Second Cup |
| --- | --- | --- |
| 30 min. | No visible change | No visible change |
| 60 min. | Pigment and polymer build up in bottom of cup from attack of sidewalls | Pigment and polymer build up in bottom of cup from attack of sidewalls |
| 90 min. | No change | No change |
| 120 min. | " | " |
| 150 min. | Pigment and polymer build up increasing | " |
| 170 min. | Bottom of cup dropped into beaker cut off at the solvent/air interface | " |
| 210 min. | Bottom of cup dissolved completely | " |
| 240 min. | No change | " |
| 300 min. | " | " |
| 360 min. | " | Metal showing at solvent air interface, but no sol- |
| 390 min. | No change | vent has passed through cup No change |
| 12 hrs. | " | " |
| 24 hrs. | " | " |
| 36 hrs. | " | " |

It should be noted in this example that the polystyrene was penetrated by the solvent. Rigidity is deemed to be an unimportant characteristic in this regard. Also, it is intended that this example demonstrate that pigmentation found in the polystyrene does not block penetration by the solvent employed.

EXAMPLE 2

First and second natural rubber surgical gloves were provided. The second glove was vacuum evaporation coated with a thin opaque film of aluminum. A 2"×2" segment was cut from the palm of each glove, and held, by a rubber band, over the top of a 50 ml. beaker. The rubber band encircled the outside of the beaker about ¼ inch below the top of the beaker. The center of each segment was dosed with one millimeter of toluene and covered with a one inch watch glass to inhibit evaporation. The segment from the first glove was badly distorted and penetrated 2" into the beaker below. The segment from the second glove (coated with aluminum) shown no distortion after fifteen minutes of exposure to the toluene.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A protective sheet for use as an article of clothing comprising:
   a. a first layer of soft pliant material having a low initial tensile modulus of elasticity;
   b. a second layer held to said first layer, and second layer comprising a ductile material capable of forming positive ions and being impermeable to fluids, said second layer being thinner than said first layer, said first and second layers forming opposite first and second surfaces of the protective sheet respectively, said first surface of said protective sheet intended for serving as the inner most layer of the article of clothing; and
   c. a third layer held onto said second layer comprising a flexible oxygen impermeable, scratch resistant material.

2. The protective sheet of claim 1 in which said material of said second layer is a metal.

3. The protective sheet of claim 1 in which said material of said first layer is chosen from the group comprising essentially butyl rubber, polyurethane, polyethylene, nitrile rubber, natural rubber, silicone rubber and polyvinyl chloride.

4. The protective sheet of claim 1 in which said material of said second layer is an metal alloy.

5. The protective sheet of claim 4 in which said alloy is chosen from the group comprising essentially brass, bronze, and pewter.

6. A protective sheet for use as an article of clothing comprising:
   a. a first layer of soft pliant material having a low initial tensile modulus of elasticity;
   b. a second layer held to said first layer, said second layer comprising a ductile material of high polarity and being impermeable to fluids, said second layer being thinner than said first layer, said first and second layer forming opposite first and second surfaces of the protective sheet respectively, said first surface of said protective sheet intended for serving as the inner most layer of the article of clothing; and
   c. a third layer held onto said second layer comprising a flexible oxygen impermeable, scratch resistant material.

7. The protective sheet of claim 6 in which said material of said second layer is a metallic compound.

8. The protective sheet of claim 6 in which said material of said second layer is chosen from the group consisting essentially of gold, silver, copper, zinc, tin, lead, aluminum, platinum, rhodium, palladium, iridium, ruthenium, osmium and nickel.

9. The protective sheet of claims 1 or 6 and in which said material of said third layer is a varnish.

10. The protective sheet of claims 1 or 6 in which material of said third layer is a paint.

11. The protective sheet of claims 1 or 6 in which said material of said third layer is a lacquer.

12. The protective sheet of claim 1 or 6 in which said low initial tensile modulus of elasticity of said material of first layer is defined by a strain without failure of at least 5%, for an application of stress of between 10 and 100 psi.

13. The protective sheet of claim 1 or 6 in which said ductility of said material of said second layer is defined by an extension of 1%–4% at a tensile stress of 1000 psi.

14. The protective sheet of claims 1 or 6 in which said scratch resistance of said material of said third layer possess a minimum hardness of 2H with a pencil hardness test.

15. The protective sheet of claims 1 or 6 in which said third layer material is chosen from the group comprising polyurethane lacquer, acrylic lacquer, epoxy lacquer and cellulosic lacquer.

* * * * *